United States Patent [19]
Yata

[11] Patent Number: 4,571,459

[45] Date of Patent: Feb. 18, 1986

[54] TELEPHONE ANSWERING MACHINE

[75] Inventor: Kei Yata, Fukuoka, Japan

[73] Assignee: Matsushita Electric Industrial Co., Ltd., Sake, Japan

[21] Appl. No.: 514,589

[22] Filed: Jul. 18, 1983

[51] Int. Cl.⁴ .......................... G11B 5/00; G11B 21/00
[52] U.S. Cl. ..................................... 179/6.13; 360/105
[58] Field of Search .................... 179/6.01, 6.13, 6.15, 179/6.16; 360/69, 88, 93, 96.2, 96.3, 62, 91, 92, 75, 105

[56] References Cited

U.S. PATENT DOCUMENTS

| | | | |
|---|---|---|---|
| 3,959,591 | 5/1976 | Darwood | 179/6.13 X |
| 3,967,068 | 6/1976 | Shinohara | 179/6.13 X |
| 4,463,396 | 7/1984 | Osanai | 360/75 X |

FOREIGN PATENT DOCUMENTS 2416374 10/1975 Fed. Rep. of Germany ..... 179/6.13

*Primary Examiner*—Robert L. Richardson
*Attorney, Agent, or Firm*—Amster Rothstein & Engelberg

[57] ABSTRACT

A telephone answering machine produces a prerecorded reply message in response to detection of a calling signal from a caller and thereafter records a message of a caller in response to completion of the reproduction of the reply message. The telephone answering machine includes first and second tape drive mechanism. The first tape drive mechanism is used for running a first magnetic tape on which the reply message of a called party is prerecorded. The second tape drive mechanism is used for running a second magnetic tape on which a message of a caller is to be recorded. The first and second tape drive mechanisms are controlled by a single common operation control mechanism. The operation control mechanism includes a movable head plate on which first and second pinch-rollers of the tape drive mechanisms are mounted, and a cam gear which has first and second drive cam grooves to control the movement of the head plate in two different directions. When the first drive cam groove controls the movement of the head plate, the first pinch-roller only contacts a corresponding capstan to run the first magnetic tape for reproduction of the reply message. When the second drive cam groove controls the movement of the head plate, the second pinch-roller only contacts a corresponding capstan to run the second magnetic tape for recording of a caller's message.

18 Claims, 6 Drawing Figures

TELEPHONE ANSWERING MACHINE

DESCRIPTION OF THE INVENTION

The present invention relates to a telephone answering machine for reproducing a prerecorded reply message of a called party in response to detection of a message of a caller and for recording a message of a caller in response to completion of the reproduction of the reply message, and more particularly relates to an improved operation mechanism of a telephone answering machine in which a first magnetic tape for reproducing the reply message and a second magnetic tape for recording a message of a caller are both controlled by a single control mechanism.

Conventional telephone answering machines generally use two magnetic tapes accommmodated in cassettes. One magnetic tape has a prerecorded reply message of a called party and is used for reproducing the prerecorded reply message. The other magnetic tape is used for recording a message from a caller, i.e., caller's message. To run these two magnetic tapes, the machine includes first and second tape drive mechanisms. These two tape drive mechanisms are provided separately and also operated separately by two operation control mechanisms. These operation control mechanisms normally include first and second capstans, and first and second pinch-rollers, respectively, to run the magnetic tapes at constant speed. Briefly, the operation of such a conventional telephone answering machine is as follows: (1) the machine detects a calling signal from a caller and produces a start signal; (2) a first electromagnetic solenoid is energized in response to the start signal to press the first pinch-roller into contact with the first magnetic tape and the first capstan. At this time, the first capstan is rotated by a motor and, thus, the first magnetic tape runs to reproduce the reply message recorded thereon. The first electromagnetic solenoid is kept energized until the reproduction of the reply message is completed. (3) The machine detects the completion of the reproduction of the reply message and produces an advance signal. (4) The first electromagnetic solenoid is de-energized and then a second electromagnetic solenoid is energized in response to the advance signal. When the first solenoid is de-energized, the first pinch-roller returns to its initial position away from the first capstan to stop the first magnetic tape. When the second solenoid is energized, it presses the second pinch-roller into contact with the second magnetic tape and the second capstan. At this time, the second capstan is rotated by the motor and, thus, the second magnetic tape runs to record the caller's message. The second solenoid, like the first solenoid, is kept energized until, for example, a predetermined recording time passes. (5) When, for example, the second magnetic tape runs for 30 seconds, the second solenoid is automatically de-energized and, thus, the second magnetic tape stops. The machine returns to the initial standby position to wait for a next calling signal.

This kind of conventional telephone answering machine is disclosed in U.S. Pat. No. 3,721,765, issued March 20, 1973. This patent relates to a telephone answering machine which includes two tape drive mechanisms and two electromagnetic solenoids for operating the tape drive mechanisms separately.

However, such kind of conventional telephone answering machines have several disadvantages, among which are as follows: (1) since each pinch-roller is pressed to the corresponding capstan to run the magnetic tape by means of the electromagnetic solenoid, it is necessary that each solenoid has enough power to press the pinch-roller to the capstan for proper running of the magnetic tape. This means each solenoid must be of large power capacity and be expensive. (2) Since each solenoid must be kept in the energized condition during the tape running period, a lot of power is consumed solely for the holding operation of each pinch-roller. (3) It is necessary to provide at least two switching circuits for operating the two solenoids and a timing control circuit for adjusting the timing of energizing and de-energizing of the two solenoids. This requires complex control circuitry.

The present invention, therefore, has as its principal object the provision of an improved telephone answering machine which has a single common operation control for first and second tape drive mechanisms, the first for reproducing a prerecorded reply message and the second for recording a message of a caller.

Another object of the invention is to provide an improved telephone answering machine in which the first and second tape drive mechanisms are operated one after the other by a single cam device in such manner that the first tape drive mechanism operates in the first cycle of operation of the cam device and the second tape drive mechanism operates in the second cycle of operation of the cam device.

A further object of the invention is to provide an improved telephone answering machine by use of the single cam device in which the first and second cycles of the operation of the cam device are triggered by a single electromagnetic solenoid.

A still further object of the invention is to provide an improved telephone answering machine using a single cam device in which the cam device has first and second drive cam portions, the first cam portion being used in the first cycle of operation of the cam device to operate the first tape drive mechanism and the second cam portion being used in the second cycle of operation of the cam device to operate the second tape drive mechanism, and a cam follower is disposed so as to couple one of the first and second drive cam portions to one of the first and second tape drive mechanisms.

Still another object of the invention is to provide an improved telephone answering machine using the single cam device having first and second drive cam portions and the cam follower driven by one of the drive cam portions in which the cam device is triggered to operate by a single electromagnetic solenoid and when the solenoid is triggered, the cam follower selects one of the first and second drive cam portions, while the cam follower is set to select the other drive cam portion when the solenoid is de-energized.

A further object of the invention is to provide an improved telephone answering machine using a single cam device in which the cam device is kept in its stop position by a stop device and when an electromagnetic solenoid is energized instantaneously to simply release the engagement of the cam device and stop device, the cam device starts to rotate until it is stopped again by the stop device.

A still further object of the invention is to provide an improved telephone answering machine using a single cam device in which the cam device is driven by the same power source as that of the tape drive mechanism.

These and other objects are accomplished according to the present invention, by a telephone answering machine for reproducing a prerecorded reply message of a called party in response to detection of a calling signal from a caller and for recording a message of a caller in response to completion of the reproduction of the reply message, which includes a first tape drive means for running a first magnetic tape on which the reply message of the called party is prerecorded, and a second tape drive means for running a second magnetic tape on which a message of a caller is to be recorded. The first and second tape drive means are controlled by a single common operation control means which includes cam means and actuating means. The cam means controls the operation of the first and second tape drive means in such manner that the first tape drive means operates to run the first magnetic tape in a first cycle of operation of the cam means and the second tape drive means operates to run the second magnetic tape in a second cycle of operation of the cam means. The actuating means controls the operation of the cam means in such manner that the cam means does the first cycle operation when the actuating means is activated a first time and the cam means does the second cycle operation when the actuating means is activated a second time.

In a particular embodiment, each of the first and second tape drive means includes a capstan which is rotated by a motor and a pinch-roller which presses the magnetic tape against the capstan to run the tape. The cam means includes a cam wheel which has first and second drive cam grooves and a cam follower which is guided for movement along the cam wheel by one of the cam grooves. The actuating means includes a stop lever which stops the cam wheel in its stop position, an electromagnetic solenoid which, when energized for a first predetermined time period, releases the engagement of the stop lever and the cam wheel, and a drive wheel which, after the engagement of stop lever and cam wheel, is released, rotates the cam wheel until the cam wheel is stopped again by the stop lever. The cam follower is always forced by a first spring means to select one of the first and second drive cam portions. When the electromagnetic solenoid is energized for a second predetermined time period, longer than the first predetermined time period, it forces the cam follower against the force of the first spring means to select the other drive cam portion. The cam wheel has a cutout portion at a part of its periphery to which the drive wheel is opposed when in the stop condition. The cam wheel is also engaged by a second spring means. When the solenoid is energized and releases the engagement of the cam wheel and stop lever, the cam wheel is first rotated by the force of the second spring means to engage the drive wheel and, after the cam wheel is engaged with the drive wheel, it is rotated by the drive wheel. The first and second pinch-rollers of the first and second tape drive means are disposed on a slidable single head plate which is driven by the cam follower. When the cam follower moves in one direction, the head plate moves toward the first magnetic tape and the first capstan and when the cam follower moves in the other direction, the head plate moves toward the second magnetic tape and the second capstan.

In another particular embodiment, the head plate and the cam follower are combined as a single T-shaped lever which is rotatable at its center position. The first and second pinch-rollers are disposed on the T-shaped lever at both side branches and the center branch of the T-shaped lever functions as a cam follower.

In still another particular embodiment, two head plates are provided for mounting the first and second pinch-rollers separately thereon. The two head plates are driven by the T-shaped lever one after the other.

While the novel features of the invention are set forth with particularly in the appended claims, the invention, both as to organization and content, will be better understood and appreciated, along with other objects and features thereof, from the following detailed description taken in conjunction with the drawings, in which:

Referring to FIGS. 1–4, there is illustrated a telephone answering machine which includes two tape drive mechanisms and a single common operation control mechanism used for operating the two tape drive mechanisms in accordance with and embodying the features of the first embodiment of the present invention. The telephone answering machine of the embodiment is of a type which reproduces a prerecorded reply message of a called party, i.e., a user of the machine in response to detection of a calling or ringing signal from a caller and thereafter records a caller's message in response to completion of the reproduction of the reply message.

Figure 1:
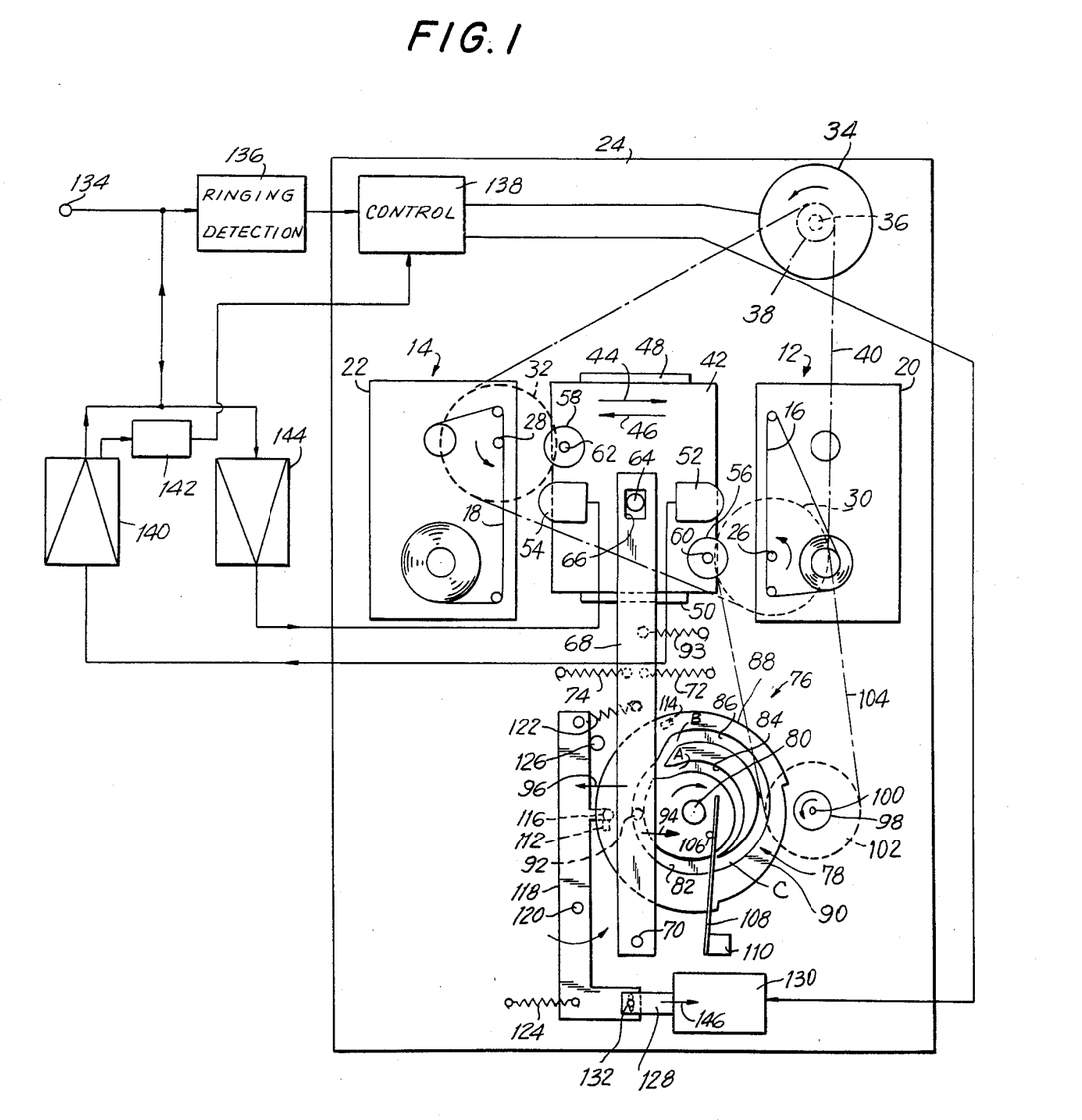
FIG. 1 shows a schematic plan view of a telephone answering machine of a first embodiment of the present invention which is a standby position waiting for a call.

The telephone answering machine includes first and second tape drive mechanisms 12, 14 for running first and second magnetic tapes 16, 18 which are accommodated in first and second tape cassettes 20, 22. The first tape cassette 20 is used for reproducing the reply message which is prerecorded on the first magnetic tape 16 thereof. This first magnetic tape 16 is of the endless type. A special tone signal is also prerecorded thereon, at a position right after the end point of the reply message, for distinguishing a completion or end point of the reply message on the tape 16. The second tape cassette 22 is used for recording the caller's message on the second magnetic tape 18. The cassette 22 is of the reel-to-reel type and has two reels therein to which both ends of the tape 18 are attached. These two cassettes 20, 22 are standard and conventional, and can be readily obtained. As shown in FIG. 1, these tape cassettes 20, 22 are positioned on a chassis 24 by means of conventional positioning means (not shown) in such manner that tapes 16 and 18 face each other through openings (not shown) of cassettes 20, 22 which are located at left end surface of cassette 20 and at right end surface of cassette 22. Exposed parts of tapes 16, 18 through the openings are substantially in parallel with each other.

The first and second tape drive mechanisms 12, 14 include first and second capstans 26, 28, respectively.

When cassettes 20, 22 are positioned as shown in FIG. 1, first and second capstans 26, 28 extend upwardly within the cassettes adjacent tapes 16, 18 respectively. These capstans 26, 28 are mounted rotatably on chassis 24 by use of bearings (not shown) which are fixed on chassis 24. First and second flywheels 30, 32 are fixed at the underside of chassis 24 to the base ends of capstans 26, 28 for supplying constant speed of rotation to capstans 26, 28. Capstan drive motor 34 is fixedly mounted on chassis 24 at a position which corresponds to one of apexes of a triangle formed by flywheels 30, 32 and motor 34. The motor has shaft 36 which extends downwardly through chassis 24. A drive pulley 38 is attached and fixed to shaft 36. An endless loop drive belt 40 is disposed among flywheels 30, 32 and drive pulley 38 of motor 34 on the underside of chassis 24. Each of flywheels 30, 32 and drive pulley 38 may have at least one groove at its periphery which receives drive belt 40. The capstans 26, 28 therefore continuously rotate when motor 34 is rotating. As motor 34 rotates counter-clockwise, capstans 26, 28 also rotate counter-clockwise in FIG. 1.

Slideable head plate 42 is disposed between two positions on chassis 24 to which first and second tape cassettes 20, 22 are placed. The plate 42 are slidably mounted in both directions 44, 46 which are perpendicular to opposite end surfaces of cassettes 20, 22 by guide means 48, 50. First and second magnetic heads 52, 54 are fixed on plate 42 at positions close to both side ends thereof and also at substantially the center portion of the side ends in such manner that the front surface (head gap portion) of first magnetic head 52 is opposed to first magnetic tape 16 and the front surface (head gap portion) of second magnetic head 54 is opposed to second magnetic tape 18. The first magnetic head 52 is used for reproducing the pre-recorded reply message from first magnetic tape 16. The second magnetic head 54 is used for recording the caller's message on second magnetic tape 18. First and second pinch-rollers 56, 58 which are included in the first and second tape drive mechanisms 12, 14, respectively, are mounted rotatably on shafts 60, 62 fixed to head plate 42 at their base ends. The first pinch-roller 56 is placed opposite to first capstan 26 and second pinch-roller 58 is placed opposite to second capstan 28. Both pinch-rollers 56, 58 are, as shown in FIG. 1, disposed close to first and second magnetic heads 52, 54 respectively at positions close to both side ends of head plate 42. At least tape drive mechanism 14 of the two tape drive mechanisms further includes fast-forward and fast-rewind means for running the tape at faster speed. Since these means are conventional and do not directly relate to the invention, the explanation thereof is omitted.

When head plate 42 moves in the direction 44, first pinch-roller 56 presses first magnetic tape 16 against rotating capstan 26 causing the tape to run and, at the same time, magnetic head 52 comes in contact with the tape 16 to reproduce the prerecorded reply message. On the other hand, when head plate 42 moves in the direction 46 (reverse of the direction 44), second pinch-roller 58 presses second magnetic tape 18 against rotating capstan 28 causing the second tape 18 to run and, at the same time, magnetic head 54 becomes in contact with the second tape to record the caller's message on the tape.

A pin 64 is fixed on head plate 42 extending upwardly. A rectangular hole 66, which is formed on one end portion of drive lever 68, engages pin 64. The other end of drive lever 68 is rotatably mounted on chassis 24 by shaft 70. When drive lever 68 is rotated clockwise around shaft 70, head plate 42 is moved in the direction 44 to run the first magnetic tape 16. When drive lever 68 is rotated counter-clockwise, head plate 42 is moved in the direction 46 to run second magnetic tape 18. Two tension springs 72, 74 are disposed between drive lever 68 and chassis 24. These springs 72, 74 are disposed at opposite positions through drive lever 68 therebetween and used for keeping plate 42 at its neutral position, that is, a position of plate 42 at which distance between head 52 and tape 16 or between pinch-roller 56 and capstan 26 is substantially equal to distance between head 54 and tape 18 or between pinch-roller 58 and capstan 28, as shown in FIG. 1. When head plate 42 moves in the direction 44, spring 74 operates to return the plate 42 to its neutral position and when head plate 42 moves in the direction 46, spring 72 operates to return plate 42 to its neutral position.

The drive lever 68 and head plate 42 are driven by a single common operation control mechanism 76 which includes cam gear 78. The cam gear 78 is rotatably mounted on chassis 24 by shaft 80 mounted on chassis 24. The cam gear 78 includes cam grooves 82, 84, 86 which are formed in an upper surface of cam gear 78 and interconnected to one another, and gear teeth portion 88 with no-teeth or cut-out portion 90 at the periphery of cam gear 78. A cam pin 92 is disposed on the underside of drive lever 68 and inserted in the cam groove 88 of cam gear 78. The groove 82 is a common cam groove which is disposed on a part of concentric shaft 80. That means distance D1 between groove 82 and shaft 80 is substantially the same at every part of groove 82. The groove 84 is a first drive or inner cam groove and distance D2 between groove 84 and shaft 80 is smaller than the distance D1. That is, the first drive cam groove 84 is designed to drive the cam pin 92 with drive lever 68 in the direction 94 to move head plate 42 in the direction 44 for running the first magnetic tape 16. The last groove 86 is a second drive or outer cam groove and distance D3 between groove 86 and shaft 80 is larger than the distance D1. That is, the second drive cam groove 84 is designed to drive the cam pin 92 with drive lever 68 in the direction 96 to move head plate 42 in the direction 46 for running the second magnetic tape 18. For movement of head plate 42, the distances D2 and D3 vary so that point A is smallest distance D2 position and point B is largest distance D3 position.

In FIG. 1, the cam pin 92 is forced into light contact with an inner surface of common cam groove 82 by means of tension spring 93 which is disposed between drive lever 68 and chassis 24. The inner surface of groove 82 means one of inner side surfaces of groove 82 which is closer to shaft 80 than the other. Therefore, when cam gear 78 rotates clockwise from the FIG. 1 position, cam pin 92 is first guided by common cam groove 82 and then driven by first drive cam groove 84. In order that cam pin 92 is first guided by common cam groove 82 and then driven by second drive cam groove 86, the cam pin 92 must be forced into contact with an outer surface of the groove 82. The outer surface of groove 82 means the other inner side surface of groove 82 which is away from shaft 80. This will be explained in greater detail below.

In order to rotate cam gear 78, drive gear 98 is rotatably mounted on chassis 24 by shaft 100. The shaft 100 is rotatable in a bearing (not shown) attached to chassis 24 and the base end of shaft 100 is fixed to flywheel 102 which is disposed on the underside of chassis 24. An endless loop drive belt 104 is disposed between flywheels 30 and 102. These flywheels may have grooves at their periphery which receive the belt 104. When motor pulley 38 rotates counter-clockwise, the drive gear 98 is driven counter-clockwise. The drive gear 98 is disposed at such position that it can be engaged with gear teeth portion 88 of cam gear 78. However, the drive gear 98 is normally positioned opposite to no-teeth portion 90 of cam gear 78 so as not to be engaged with gear teeth portion 88.

The cam gear 78 also has pin 106 on the upper surface thereof extending upwardly. A leaf spring 108 is of inverted L-shape and its base portion 110 is fixed on chassis 24. In FIG. 1, the spring 108 presses pin 106 to push cam gear 78 in the clockwise rotation direction. The pressure for rotation of cam gear 78 by means of spring 108 is maintained by the engagement of one of pins 112, 114 of cam gear 78 and stop pin 116. These pins 112, 114 are disposed on the underside of cam gear 78 with equal distances from shaft 80. The stop pin 116 is formed as a part of L-shaped stop lever 118 which is rotatably mounted on chassis 24 by shaft 120. A tension spring 122 is disposed between one end of stop lever 118 and drive lever 68. This tension spring 122 is used for forcing the cam pin into contact with the outer surface of the groove 82 when the tension spring 122 is stretched. In the standby condition of FIG. 1, the spring 122 does not have tension since it is not yet stretched. When stop lever 118 rotates counter-clockwise around shaft 120, spring 122 is stretched and generates tension force to bring cam pin 92 into contact with the outer surface of common cam groove 82 of cam gear 78. When cam gear 78 rotates clockwise under such condition, the cam pin 92 is first guided by common cam groove 82 and then driven by second drive cam groove 86 as explained before.

Another tension spring 124 is disposed between the corner end of stop lever 118 and chassis 24. The spring 124 is used for giving stop lever 118 a clockwise rotation force. The clockwise rotation of stop lever 118 is stopped by stop pin 126 disposed on chassis 24. The spring 124 is also used for obtaining returning force of plunger 128 of electromagnetic solenoid 130. That is, electromagnetic solenoid 130 is fixed on chassis 24 and its movable plunger 128 is connected to the other end of stop lever 118 by use of coupling pin 132. In FIG. 1, plunger 128 and spring 124 are disposed on one straight line.

When the electromagnetic solenoid 130 is energized, its plunger 128 is pulled in the solenoid 130 by the magnetic force generated by the solenoid 130 and causes stop lever 118 to rotate counter-clockwise around shaft 120 so that the engagement of pins 116 and 112 is released. After the release of the engagement, cam gear 78 rotates clockwise by the pressure of leaf spring 108 against pin 106. After a small rotation of cam gear 78, electromagnetic solenoid 130 is de-energized, and stop lever 118 and plunger 128 return to their initial position shown in FIG. 1 by the restoring forces of springs 122, 126. By the small rotation of cam gear 78, its gear teeth portion 88 is engaged with rotating drive gear 98 which in turn drives the cam gear 78 until the drive gear 98 is again opposed to no-teeth portion 90 of cam gear 78. When the drive gear 98 is again opposed to the no-teeth portion 90, pin 114 is engaged with pin 116 of stop lever 118 to hold the stop position of cam gear 78. When electromagnetic solenoid 130 is again energized, the engagement of pins 114 and 116 is released and cam gear 78 rotates by the forces of springs 72, 74 and 108 until pin 112 is engaged with stop pin 116 of stop lever 118, that is, the standby position shown in FIG. 1.

In this case, the energizing time period of electromagnetic solenoid 130 determines which drive cam groove of first and second drive cam grooves 84, 86 drives cam pin 92 of drive lever 68. That is, when the solenoid 130 is de-energized during the time when the cam pin 92 is forced into contact with the inner surface of common cam groove 82 by the force of spring 93, the cam pin 92 enters first drive cam groove 84. Then, head plate 42 is driven in the direction 44. On the other hand, when the solenoid 130 remains in energized condition until after the passage of common cam groove 82, for example, at point C in FIG. 1, the cam pin 92 is forced into contact with the outer surface of the groove and thereby the cam pin 92 enters into second drive cam groove 86. Once the cam pin 92 enters into second drive cam groove 86, the pin 92 is driven by it even if the solenoid 130 is de-energized. By the drive of second drive cam groove 86, head plate 42 is driven in the direction 46. In this embodiment, 250 msec. is used as the operation time period of solenoid 130 for selecting the second drive cam groove 86. When the first drive cam groove 84 must be selected, the time period is 100 msec. which is much shorter than 250 msec. These time periods are selected based upon the consideration of various factors such as rotation speed of cam gear 78, length of groove 82, normal position of pin 92, etc.

Next, the circuit structure is explained. Telephone input terminal 134 is coupled to ringing detection circuit 136 which detects a ringing or calling signal from a caller to produce a start signal. A control circuit 138 is coupled to receive the start signal and controls motor 34 and electromagnetic solenoid 130 in response to the start signal reception. When the incoming ringing signal is detected, motor 34 starts to rotate and continues its rotation until completion of one cycle of operation of the machine, that is, the time when recording of caller's message is completed. At the same time, electromagnetic solenoid 130 is energized instantaneously to start running of tape 16. The pre-recorded reply message on first magnetic tape 16 is reproduced by first magnetic head 52 whose output signal is applied to playback amplifier 140 and amplified therein and transferred to the caller through terminal 134 over the telephone line. After the completion of reproduction of the reply message, the special tone signal, which is pre-recorded on tape 16 at the end position of the reply message, as stated before, is detected by reply message completion detection circuit 142 to produce a second start signal which is applied to the control circuit 138. When the second start signal is received, control circuit 138 activates electromagnetic solenoid 130 again to start running of second tape 18. The incoming caller's message is applied to recording amplifier 34 and amplified therein and recorded on the second magnetic tape 18 through second magnetic head 54. After the recording continues for a predetermined recording time, for example, 30 seconds or 2 minutes selectively set by a timer circuit (not shown) in the control circuit 138, the timer circuit produces an end signal to terminate the operation of the machine and to return the machine to its initial standby position as shown in FIG. 1.

Figure 2:
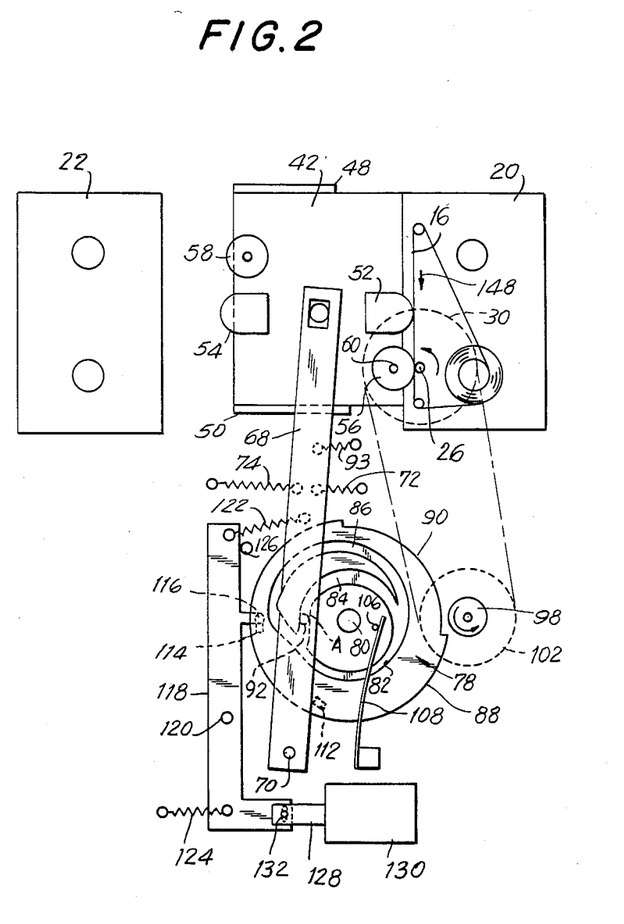
FIG. 2 shows a schematic plan view of the telephone answering machine which is in position for reproduction of a reply message.
Figure 3:
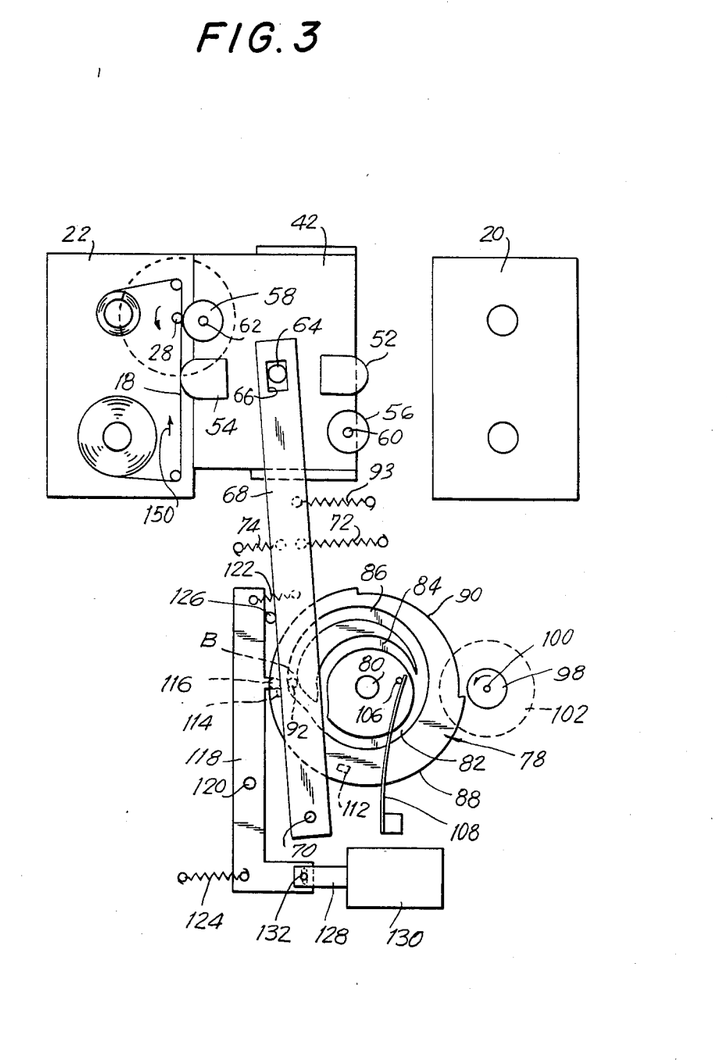
FIG. 3 shows a schematic plan view of the telephone answering machine which is in position for recording of a caller's message.

Overall operation of the machine is now explained with reference to FIGS. 2 and 3 in addition to FIG. 1. FIG. 2 shows the condition of the machine in which the prerecorded reply message is being reproduced from first magnetic tape 16. FIG. 3 shows the condition of the machine in which the caller's message is being recorded on second magnetic tape 18. FIG. 1 shows a standby condition of the machine.

In the standby position of the machine shown in FIG. 1, a function selector (not shown) of the machine is set so that the machine will be able to operate automatically in response to an incoming ringing signal from a caller. A telephone instrument (not shown) is coupled to terminal 134. When a ringing signal comes from a caller over the telephone line and is applied to terminal 134, the telephone instrument rings. The ringing detection circuit 136 detects, for example, a second ringing signal or a fourth ringing signal and closes a telephone line after the detection thereof. This closing of telephone line is equivalent to a condition in which a handset of the telephone instrument is lifted for a called party to speak with a caller. Therefore, by that closing of the telephone line, telephone ring stops and the machine is properly coupled to be able to automatically answer the caller. When ringing detection circuit 136 detects a ring of given number, control circuit 138 controls motor 34 to rotate the same counter-clockwise at predetermined constant speed. Capstans 26, 28 and drive gear 98 also rotate counter-clockwise by the rotation of motor 34.

When control circuit 138 has motor 34 rotated, the circuit 138 starts to count a predetermined interval of, for example, 200 msec. and after the lapse of 200 msec., controls electromagnetic solenoid 130 to energize the same for a predetermined time, for example, 100 msec. set in the control circuit 138. When the solenoid 130 is energized, its plunger 128 is pulled in the direction 146 and thereby, stop lever 118 rotates counter-clockwise around shaft 120 so that the engagement of stop pin 116 of the stop lever 118 and pin 112 of cam gear 78 is released. By the release of the engagement, cam gear 78 is rotated clockwise by the pressure force of leaf spring 108 against pin 106 of cam gear 78 and gear teeth portion 88 of cam gear 78 is engaged with drive gear 98. After that, drive gear 98, which is already rotating counter-clockwise, drives cam gear 78 so that cam gear 78 continues its clockwise rotation. The electromagnetic solenoid 130 is de-energized during the time when the cam pin 92 is still in common cam groove 82. At that time, plunger 128 and stop lever 118 return to their initial position shown in FIG. 1 by the force of spring 124 and since the tension force of spring 122 disappears, the cam pin 92 of drive lever 68 is forced into contact with the inner surface of common cam groove 82 by the force of spring 93. By the clockwise rotation of cam gear 78 by means of drive gear 98 under such condition, the cam pin 92, after being guided by common cam groove 82, enters into first drive cam groove 84 and is driven thereby so that cam pin 92 moves in the direction 94 and drive lever 68 rotates clockwise around shaft 70. By the clockwise rotation of drive lever 68, plate 42 moves in the direction 44 toward first tape cassette 20. Finally, the cam pin 92 reaches to point A which is closest to shaft 80 in first drive cam groove 84 as shown in FIG. 2, and simultaneously, the engagement of drive gear 98 and gear teeth portion 88 of cam gear 78 is released. When the engagement of drive gear 98 and gear teeth portion 88 of cam gear 77 is released, as shown in FIG. 2, pin 114 of cam gear 78 is engaged with pin 116 of stop lever 118 to keep cam gear 78 and plate 42 at the position of FIG. 2 although plate 42 tends to return to its initial position by interaction of springs 72, 74. Under the condition of FIG. 2, first magnetic head 52 is in contact with first magnetic tape 16 and first pinch-roller 56 presses the tape 16 against the rotating first capstan 26 causing it to run in the direction 148 and simultaneously, the prerecorded reply message on the tape 16 is derived from the head 52. The reproduced reply message from head 52 is applied through playback amplifier 140 over the telephone line to the caller.

At the end of the reply message, the prerecorded special tone signal on the tape 16 is derived from the head 52 and applied through playback amplifier 140 to detection circuit 142. The detection circuit 142, when detecting the special tone signal, produces a second start signal to control circuit 138. Then, control circuit 138 energizes electromagnetic solenoid 130 for a first predetermined time, for example, 100 msec. By this energization of solenoid 130, the engagement of stop pin 116 of stop lever 118 and pin 114 of cam gear 78 is released and cam gear 78 is rotated clockwise by the force of springs 72, 74 and 108 until pin 112 of cam gear 78 is again engaged with pin 116 of stop lever 118 as shown in FIG. 1. After the 100 msec. energization of solenoid 130, there is an interval of a predetermined time, for example, 200 msec., set in control circuit 138. After the lapse of 200 msec., control circuit 138 once again energizes electromagnetic solenoid 130 for a second predetermined time, for example, 250 msec.. By this slightly longer energization of solenoid 130, the engagement of stop pin 116 of stop lever 118 and pin 112 of cam gear 78 is released and cam gear 78 is rotated clockwise by the pressure of leaf spring 108 so that gear teeth portion 88 of cam gear 78 is again engaged with drive gear 98 to rotate cam gear 78 continuously. At this time, electromagnetic solenoid 130 is still energized and, therefore, tension spring 122 is stretched so that cam pin 92 of drive lever 68 is forced into contact with the inner surface of common cam groove 82. By the continuous clockwise rotation of cam gear 78 under such condition, the cam pin 92, after being guided by common cam groove 82, enters into second drive cam groove 86 and is driven thereby. When the cam pin 92 enters into second cam groove 86, that is, right after the passage of point C which is the entrance of second drive cam groove 86 in FIG. 1, the electromagnetic solenoid 130 is de-energized because of the lapse of 250 msec., and plunger 128 and stop lever 118 return to their initial position shown in FIG. 1 by the force of spring 124. As cam gear 78 rotates clockwise, cam pin 92 of drive lever 68 moves in the direction 96 and drive lever 68 rotates counter-clockwise around shaft 70. By the counter-clockwise rotation of drive lever 68, head plate 42 moves in the direction 46 toward second tape cassette 22. Finally, cam pin 92 reaches point B which is the most remote from shaft 80 in second drive cam groove 86 as shown in FIG. 3, and simultaneously, the engagement of drive gear 98 and gear teeth portion 88 of cam gear 78 is released. When the engagement of drive gear 98 and gear portion 88 of cam gear 78 is released as shown in FIG. 3, pin 114 of cam gear 78 is again engaged with stop pin 116 of stop lever 118 to keep cam gear 78 and plate 42 at the position of FIG. 3, although plate 42 tends to return to its initial neutral position by interaction of springs 72, 74. Under the condition of FIG. 3, second magnetic head 54 is in contact with second magnetic tape 18 and second pinch-roller 58 presses the tape 18 against the rotating second capstan 28 causing it to run in the direction 150. At that time, the caller's message, which is coming through terminal 134 and recording amplifier 144, is recorded on the tape 18 by the head 54. Recording time is set in control circuit 138, particularly by its timer circuit (not shown). The time is, for example, 30 sec. or 2 minutes.

After the completion of the recording time set in control circuit 138, control circuit 138 again energizes the solenoid 130 for a predetermined time, for example, 100 msec. By this instantaneous energization of solenoid 130, the engagement of stop pin 116 of stop lever 118 and pin 114 of cam gear 78 is released and cam gear 78 is rotated clockwise by the force of springs 72, 74 and 108 until pin 112 of cam gear 78 is again engaged with stop pin 116 of stop lever 118 as shown in FIG. 1. At the same time, control circuit 138 stops motor 34. Thereby, the machine returns to its initial standby condition waiting for a next ringing signal from a caller.

Figure 4:
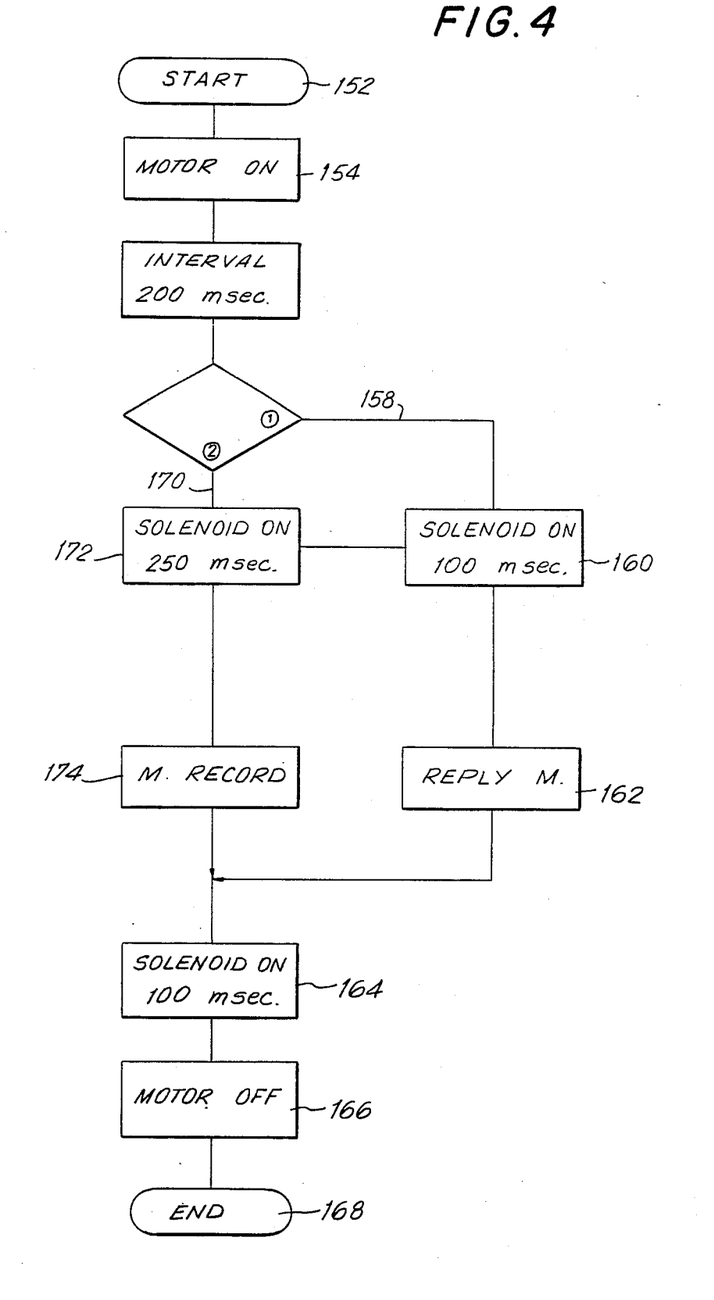
FIG. 4 is a flow chart explaining the operation of the telephone answering machine.

The above-described operation is summarized as follows with reference to FIG. 4 which is a flow chart of the operation.

(1) At start step 152, the ringing signal from the caller starts the operation of the machine.

(2) At step 154, motor 34 starts to rotate.

(3) At step 156, there is an interval of 200 msec.

(4) Then, through a first selection 158, step 160 is carried out. That is, electromagnetic solenoid 130 is energized for 100 msec.

(5) As a result, at step 162, the reply message is reproduced from first magnetic tape 16 and transferred to the caller over the telephone line.

(6) After the completion of reply message transmission, at step 164, the solenoid 130 is again energized for 100 msec.

(7) Then, at step 166, motor 34 stops its rotation and the machine returns to its initial position shown in FIG. 1 at end step 168. However, for recording the caller's message, start step 152 is again carried out and motor 34 starts to rotate at step 154. Therefore, motor 34 does not stop in case of recording the caller's message. In the case where the recording of the caller's message is not required, for example, when the user of the machine wants to simply hear the reply message for checking the contents thereof, at end step 168, the machine completely returns to its initial standby condition to wait for a call.

(8) After the step 154, there is an interval of 200 msec. again at step 156 and step 172 is carried out through a second selection 170. That is, electromagnetic solenoid 130 is energized for 250 msec., longer time period.

(9) As a result, at step 174, the caller's message is recorded on second magnetic tape 18.

(10) After the completion of the recording, or the lapse of predetermined recording time, the solenoid 130 is energized at step 164 for 100 msec. and motor 34 stops at step 166 and the machine returns to its initial standby condition to wait for the next call at end step 168.

Figure 5:
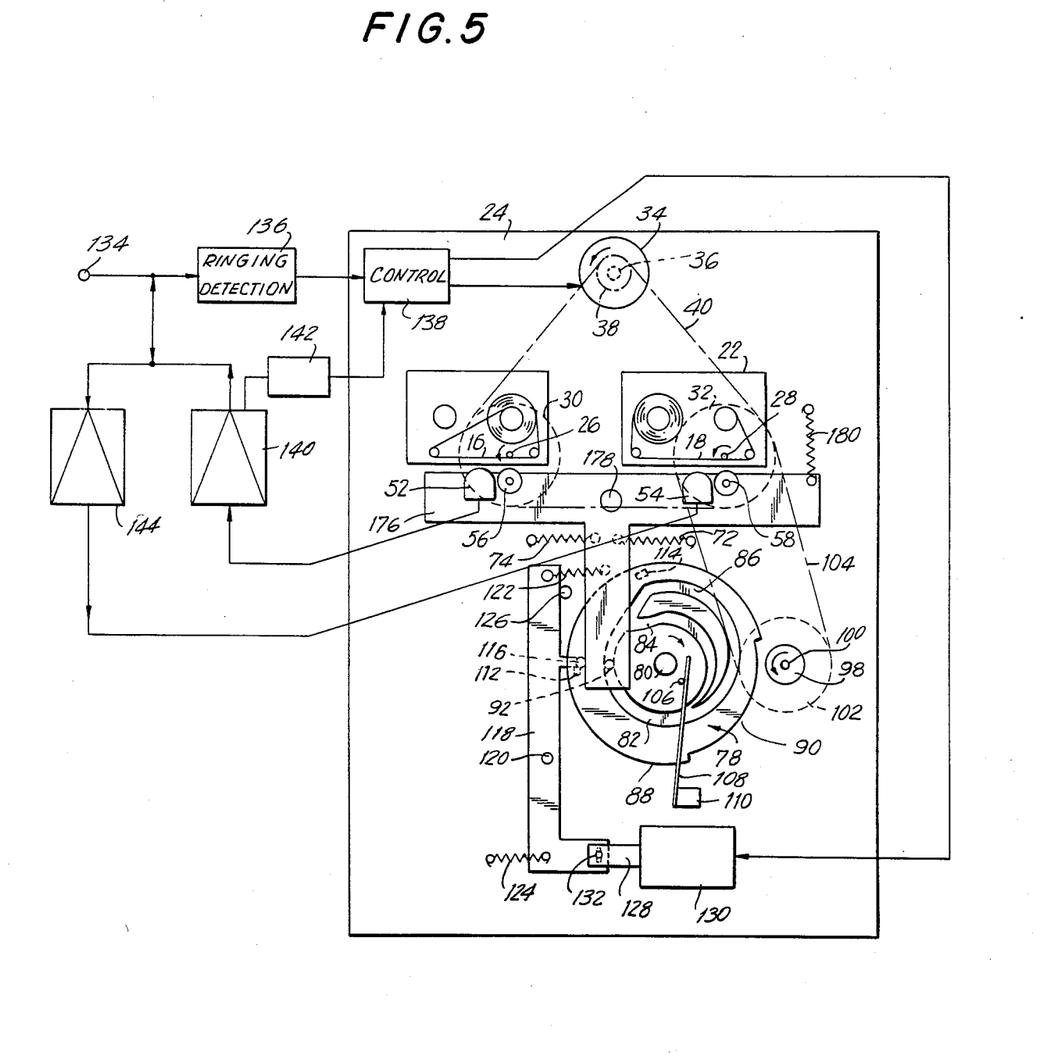
FIG. 5 shows a schematic plan view of the telephone answering machine of a second embodiment of the present invention which is the standby position.
Figure 6:
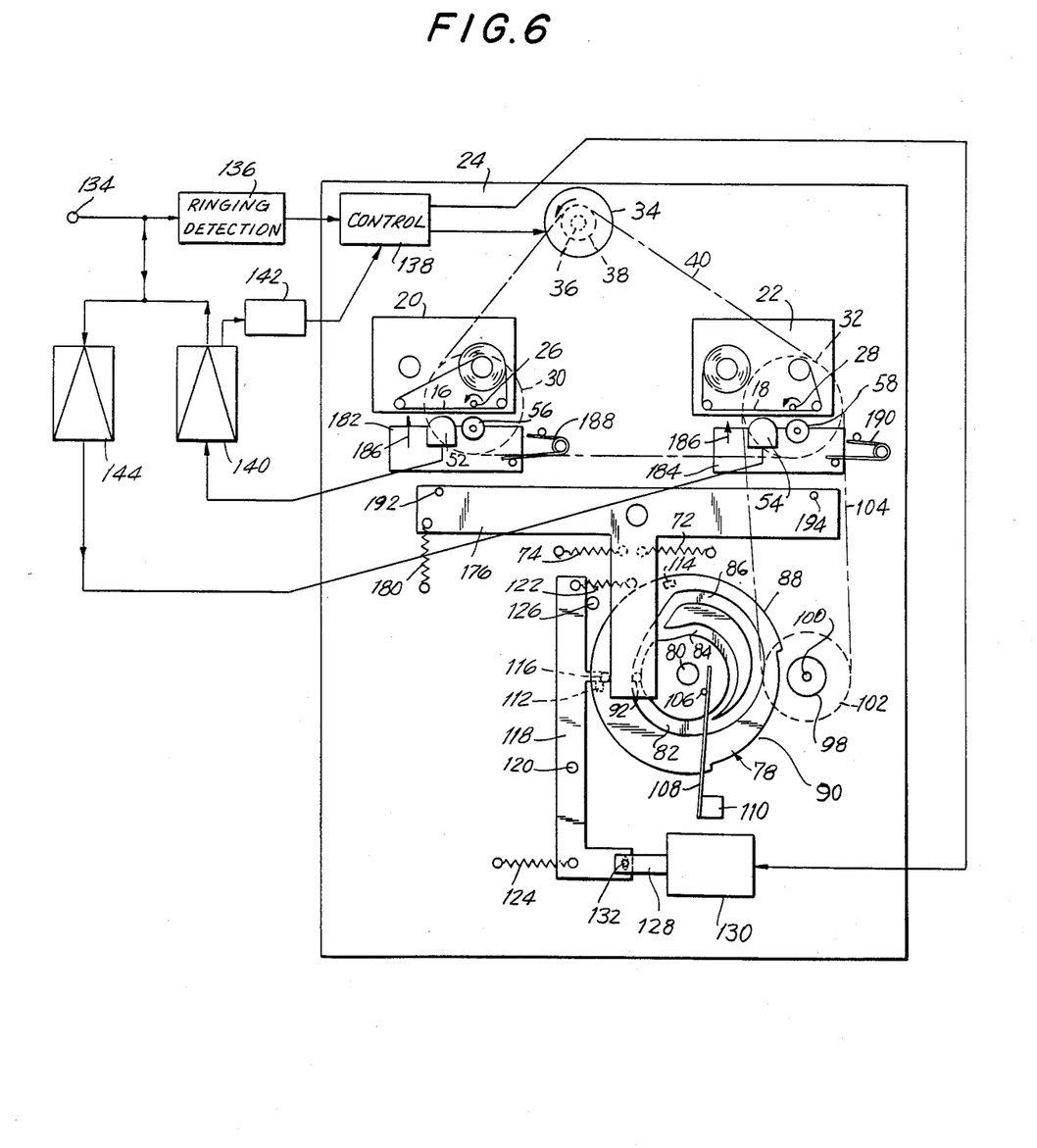
FIG. 6 shows a schematic plan view of the telephone answering machine of a third embodiment of the present invention which is the standby position.

FIGS. 5 and 6 show two other embodiments of the telephone answering machine in accordance with the invention. In these figures, like numbers denote like components in FIGS. 1–3. The embodiment of FIG. 5 is now explained. First and second tape cassettes 20, 22 are disposed side by side. Capstans 26, 28 are rotated counter-clockwise as in the first embodiment. First magnetic head 52 and first pinch-roller 56 are mounted on T-shaped lever 176 at its left side branch, which lever 176 is rotatably mounted by shaft 178. Second magnetic head 54 and second pinch-roller 58 are mounted on T-shaped lever 176 at its right side branch.

The cam pin 92 is disposed on the underside of center branch of T-shaped lever 176. This T-shaped lever 176 corresponds to the combination of head plate 42 and drive lever 68 shown in FIG. 1. Tension springs 72, 74 are disposed between the center branch of T-shaped lever 176 and chassis 24. Tension spring 122 is disposed between stop lever 118 and the center branch of T-shaped lever 176. Tension spring 180, which corresponds to tension spring 93 in FIG. 1, is disposed between the right side branch of T-shaped lever 176 so that cam pin 92 thereof is forced to be in light contact with the inner surface of common cam groove 82 of cam gear 78. Endless loop drive belt 104 is disposed between flywheels 32 and 102 so that drive gear 98 is rotated by motor 34. The remaining structure is the same as in the previous embodiment and, therefore, further structural explanation is omitted.

The operation of the second embodiment will now be explained. The operation is fundamentally the same as that of the first embodiment. The main difference is that second drive cam groove 86 is selected before first drive cam groove 84 is selected. That is, in the first embodiment of FIGS. 1–4, cam pin 92 of drive lever 68 first enters into the first drive cam groove 84 to move the head plate 42 toward the first tape cassette 20 which is placed at the right hand side in FIG. 1. On the other hand, in the second embodiment of FIG. 5, cam pin 92 first enters into the second drive cam groove 86 since T-shaped lever 176 must be rotated clockwise first to move first magnetic head 52 and pinch-roller 56 toward the first tape cassette 20 which is placed at the left hand side in FIG. 5. In other words, the placement of cassette 20 in FIG. 5 is different from that in FIG. 1 and, therefore, second drive cam groove 86 must be first selected. To select the second drive cam groove 86 first, the electromagnetic solenoid 130 must be energized first for a longer time period, 250 msec., as is apparent from the explanation of the first embodiment. The sequence of operation of the second embodiment is now explained.

When a ringing signal from a caller is detected by detection circuit 136, control circuit 138 starts the operation of the machine. That is, motor 34 starts its rotation to rotate capstans 26, 28 and drive gear 98 counter-clockwise. At the same time, electromagnetic solenoid 130 is energized to pull its plunger 128 therein for a predetermined longer time, 250 msec. By this pull-in movement of plunger 128, engagement of pins 116 and 112 is released and cam gear 78 starts its clockwise rotation. Thus, cam pin 92 moves in the left hand direction by the guide of second drive cam groove 86 to rotate T-shaped lever 176 clockwise. By the end of this clockwise rotation of T-shaped lever 176, first pinch-roller 56 presses first magnetic tape 16 against first capstan 26 to run the tape 16 for the reproduction of the reply message. The reproduced reply message is derived from first magnetic head 52 and transferred through playback amplifier 140 over the telephone line to the caller. At the end of the reply message, the special tone signal is detected by detection circuit 142 which in turn controls control circuit 138. That is, electromagnetic solenoid 130 is again energized for a predetermined shorter time, 100 msec., and after 200 msec. interval, the solenoid 130 is again energized for a predetermined shorter time, 100 msec. By the second time of operation of the solenoid 130, the engagement of pins 116 and 114 is released so that cam gear 78 rotates clockwise by the force of springs 72, 74 and 108 until the pins 116 is again engaged with pin 112. At this moment, the machine returns to its initial position of FIG. 5. By the third time of operation of the solenoid 130, the engagement of pins 116 and 112 is released and cam gear 78 starts its clockwise rotation. Then, pin 92 moves in the right hand direction by the guide of first drive cam groove 84 to rotate T-shaped lever 176 counter-clockwise. By the end of this counter-clockwise rotation of T-shaped lever 176, second pinch-roller 58 presses second magnetic tape 18 against second capstan 28 to run the tape 18 for the recording of the caller's message. That is, the caller's message, which is transferred through terminal 134 and recording amplifier 144, is recorded on the tape 18 through second magnetic head 54. After the recording continues for a predetermined time, the timer circuit of control circuit 138 stops the operation of the machine. That is, electromagnetic solenoid 130 is again energized for 100 msec., and the engagement of pins 116 and 114 is released and cam gear 78 rotates until pin 116 is again engaged with pin 112 as shown in FIG. 5. Simultaneously, control circuit 138 stops motor 34. Then, the machine returns to its initial standby condition to wait for a next call from a caller.

The structure of the third embodiment in FIG. 6 is almost the same as that of the second embodiment in FIG. 5. However, there is the following difference. In FIG. 5 heads 52, 54 and pinch-rollers 56, 58 are disposed directly on T-shaped lever 176, these heads and pinch-rollers are not disposed on T-shaped lever 176 but on separate head plates 182, 184 in FIG. 6. These separate head plates 182, 184 are slidable in the direction 186 on chassis 24. Twisted coil springs 188, 190 are disposed between first head plate 182 and chassis 24, and second head plate 184 and chassis 24, respectively. These head plates 182, 184 are forced in the reverse direction of direction 186 by springs 188, 190 but kept at the position shown in FIG. 6 by stop means (not shown). The T-shaped lever 176 has push pins 192, 194 at both side branches. These push pins 192, 194 are designed to be able to be engaged with the back ends of head plates 182, 184 and push the head plates in the direction 186, respectively. That is, when the T-shaped lever 176 rotates clockwise by drive gear 98, pin 192 pushes first head plate 182 in the direction 186. At the end of forward movement of first head plate 182, the first magnetic tape 16 runs for reproduction of the reply message. When T-shaped lever 176 returns to its initial position shown in FIG. 6, first head plate 182 also returns to its initial position shown in FIG. 6 by the force of spring 188. On the other hand, when T-shaped lever 176 rotates counter-clockwise by drive gear 98, pin 194 pushes second head plate 184 in the direction 186. At the end of forward movement of second head plate 184, the second magnetic tape 18 runs for recording of the caller's message. When T-shaped lever 176 returns to its initial position as shown in FIG. 6, second head plate 184 also returns to its initial position shown in FIG. 6 by the force of spring 190. Since heads 52, 54 and pinch-rollers 56, 58 move towards tapes 16, 18 along the direction 186 which is perpendicular to tape running path, positioning of the head and pinch roller against the tape can be set more precisely as compared with FIG. 5 structure. Other operations of FIG. 6 machine are the same as FIG. 5 machine and, thereby, further explanation is omitted.

As is apparent from the above embodiments, selection of first and second cam groove 84, 86 is carried out simply by changing the operation time period of solenoid 130. That is, when solenoid 130 is energized for a shorter time (e.g., 100 msec.), first cam groove 84 is selected so that pin 92 enters therein and when solenoid 130 is energized for a longer time (e.g., 250 msec.), second cam groove 86 is selected so that pin 92 enters therein.

While, in the above embodiments, the end of the reply message is detected by use of the special tone signal which is prerecorded on tape 16 and detection circuit 142 therefor, the end can be detected by use of a conventional conductive sensing foil which is attached to one specific portion of the endless tape 16, and generally distinguishes the start point of the reply message, and detection contacts and circuit therefor. That is, a pair of contacts are disposed on plate 42 (or 176, 182) and in contact with the tape 16 when the tape is running. When the conductive foil of the tape 16 reaches to the contacts, the contacts are electrically closed and a detection circuit which is connected to the contacts detects such situation.

Further, it is possible to use the combination of the special tone signal and the conductive sensing foil. For example, after the end of the reply message is detected by use of the special tone signal, the recording of the caller's message starts. After the completion of the recording, the reply message tape 16 once again runs without the reply message being transferred to the caller until the conductive sensing foil is detected by the detection contacts. When the detection contacts detect the sensing foil, the machine returns to the initial standby position. When the machine is again activated in response to a next call, the reproducing head 52 is brought into contact with the start point of the reply message and, therefore, the reply message is reproduced and transferred to a caller without delay.

While in the above embodiments, independent spring 93 or 180 is used for bringing pin 92 in light contact with the inner surface of common cam groove 82, the spring 93 or 180 can be omitted by adjusting the strength of springs 72, 74 in such manner that the strength of spring 74 is a little larger than that of spring 72.

Further, in the above embodiments, cam gear 78 and drive gear 98 can be replaced by cam wheel and drive wheel which have friction portion at their periphery of, for example, rubber material.

Still further, while in the above embodiments, tension spring 93 is used for forcing cam pin 92 to be in contact with the inner side surface of the cam groove 82 and tension spring 122 is used for when the solenoid 130 is energized, forcing cam pin 92 to be in contact with with outer side surface of the cam groove 82, if, for example, spring 93 is disposed between drive lever 68 and its left side chassis portion and stop lever 118 and spring 122 are disposed on the right side of drive lever 68, the spring 93 functions to force cam pin 92 to be in contact with the outer side surface and spring 122 functions to force cam pin 92 to be in contact with the inner side surface of cam groove 82. In this case, when the solenoid 130 is energized for the shorter time, 100 msec., the second drive cam groove 86 is selected and when the solenoid 130 is energized for the longer time, 250 msec., the first drive cam groove 84 is selected. Also, in this case, the spring 93 can be omitted by adjusting the strength of springs 72, 74 in such manner that the strength of spring 72 is a little larger than that of spring 74.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. A telephone answering machine for reproducing a prerecorded reply message of a called party in response to detection of a calling signal from a caller and for recording a message of a caller in response to the completion of reproduction of the reply message, comprising:
a first magnetic tape having said prerecorded reply message thereon;
a second magnetic tape for recording the caller's message thereon;
a first tape drive means for running said first magnetic tape to reproduce the reply message therefrom;
a second tape drive means for running said second magnetic tape to record the caller's message thereon;
a drive source for driving said first and second tape drive means; and
a single common operation control means for controlling the operations of said first and second tape drive means in such manner that the first tape drive means operates in a first cycle of operation of said single common operation control means and the second tape drive means operates in a second cycle of operation of said single common operation control means.

2. The telephone answering machine of claim 1, wherein said first magnetic tape is an endless cassette tape accommodated in a cassette and said second magnetic tape is a reel-to-reel type cassette tape, both ends of which are attached to reels accommodated in a cassette.

3. The telephone answering machine of claim 1, wherein each of said first and second drive means includes a capstan which is rotated by said drive source and a pinch-roller which presses the magnetic tape against said capstan to run the tape.

4. The telephone answering machine of claim 3, wherein said drive source is a motor for rotating said capstan.

5. The telephone answering machine of claim 1, wherein said single common operation control means includes cam means which operates said first and second tape drive mechanisms one after the other in such manner that the first tape drive means operates in a first cycle of movement of the cam means and the second tape drive means operates in a second cycle of movement of the cam means, and actuating means which actuates said first and second movements of the cam means.

6. The telephone answering machine of claim 5, wherein said cam means includes first and second drive cam portions, the first drive cam portion being used for driving said first tape drive means in said first cycle of movement of the cam means and the second drive cam portion being used for driving said second tape drive means in said second cycle of movement of the cam means, and a cam follower which couples one of the first and second drive cam portions to one of the first and second tape drive means.

7. The telephone answering machine of claim 5, wherein said actuating means includes stop means which can be engaged with the cam means to stop the same in its stop position, release means which release the engagement of the stop means and the cam means, and drive means which moves the cam means after the engagement is released by said release means until the cam means is stopped again by the stop means.

8. The telephone answering machine of claim 7, wherein said cam means includes a single cam wheel, said stop means includes a stop lever which can be engaged with said cam wheel, said release means includes an electromagnetic solenoid which, when energized, releases the engagement of said cam wheel and the stop lever, and said drive means includes a drive wheel which, after the engagement is released, rotates said cam wheel until the cam wheel is stopped again by said stop lever.

9. The telephone answering machine of claim 6, wherein said cam follower is always forced to select one of said first and second drive cam portions and when said actuating means operates, the actuating means forces the cam follower against the previous force to the follower so that the cam follower selects the other drive cam portion.

10. The telephone answering machine of claim 3, wherein said pinch-rollers of said first and second tape drive means are mounted on a single head plate, which is coupled to said single operation control means, and said head plate is disposed slidably between said first and second magnetic tapes, whereby in said first cycle of operation of the operation control means, said head plate is moved in one direction so that one pinch-roller thereon presses the first magnetic tape against corresponding capstan to run the first magnetic tape and in said second cycle of operation of the operation control means, said head plate moves in the other direction so that the other pinch-roller presses the second magnetic tape against the other capstan to run the second magnetic tape.

11. The telephone answering machine of claim 10, wherein said single common operation control means includes a cam wheel, and said single head plate is a T-shaped lever rotatable around its center portion, said pinch-rollers being disposed on both side branches of said T-shaped lever and the center branch of the lever is directly coupled to said cam wheel.

12. The telephone answering machine of claim 3, wherein said pinch-rollers of said first and second tape drive means are mounted on two head plates separately and said two head plates are operated by a T-shaped lever which is coupled to said single common operation control means, one after the other to run the first and second magnetic tapes one after the other.

13. The telephone asnwering machine of claim 5, wherein said cam means is drive by said drive source which drives said first and second tape drive means.

14. In a telephone answering machine including a first magnetic tape having a prerecorded reply message of a called party, a second magnetic tape for recording a message from a caller, a first tape drive means for running said first magnetic tape in response to detection of a calling signal from a caller to reproduce said reply message, a second tape drive means for running said second magnetic tape in response to completion of the reproduction of said reply message to record the message of the caller, and control means for controlling the operations of said first and second tape drives in the above-described manner,
said control means includes,
cam means for starting the operations of said first and second tape drives one after the other in such manner that the first tape drive operates in a first cycle of operation of said cam means and said second tape drive means operates in a second cycle of operation of said cam means, trigger means for starting one cycle of operation of said cam means, and trigger control means for operating said trigger means in such manner that said trigger means causes said cam means to do said first cycle of operation in response to the detection of the calling signal and to do said second cycle of operation in response to the completion of the reproduction of the reply message.

15. The telephone answering machine of claim 14, wherein said cam means includes a cam wheel and a cam follower which couples said cam wheel to said first and second tape drive means, and said trigger means includes a stop lever which can be engaged with said cam wheel to keep the same in its stop position and an electromagnetic solenoid which, when energized, releases the engagement of said cam wheel and stop lever, and said trigger control means includes a control circuit which energizes the solenoid for a predetermined time set therein.

16. The telephone answering machine of claim 15, wherein said cam wheel has first and second drive cam portions thereon, said first drive cam portion being used for driving said first tape drive means and said second drive cam portion being used for driving said second tape drive means, and further comprising spring means for forcing said cam follower in one direction so that the cam follower always selects one of said first and second drive cam portions and when said solenoid is energized, the solenoid forces said cam follower against said spring means to select the other drive cam means.

17. A telephone answering machine for reproducing a prerecorded reply message of a user of said machine in response to detection of a calling signal from a caller and for recording a message of a caller in response to completion of the reproduction of said reply message, comprising:

a first tape cassette accommodating a first magnetic tape on which said reply message is prerecorded;

a second tape cassette accommodating a second magnetic tape for recording the message of the caller thereon;

a first tape drive means for running said first magnetic tape to reproduce the reply message, said first tape drive means including a first capstan and a first pinch-roller;

a second tape drive means for running said second magnetic tape to record the message of the caller thereon, said second tape drive means including a second capstan and a second pinch-roller;

a single motor for driving said first and second capstans;

a single movable plate having said first and second pinch-rollers thereon;

a single cam gear disposed rotatably for moving said movable plate in such manner that said first pinch-roller contacts with said first capstan in a first cycle of rotation of said cam gear and said second pinch-roller contacts with said second capstan in a second cycle of rotation of said cam gear, said cam gear having a no-teeth portion at the periphery thereof and a detent portion;

a drive gear disposed proximate said no-teeth portion without contacting the periphery of said cam gear, said drive gear being rotated by said motor;

a stop lever disposed movably for stopping the rotation of said cam gear by being engaged with said detent portion of said cam gear;

a leaf spring disposed proximate said cam gear for applying an initial rotation torque to said cam gear;

an electromagnetic solenoid coupled to said stop lever for releasing the engagement of said stop lever and the detent portion of said stop lever to rotate said cam gear by said spring and to thereby contact said cam gear with said drive gear for one cycle of rotation of said cam gear; and a control circuit coupled to said electromagnetic solenoid for controlling the operation of said solenoid in such manner that said stop lever is moved to release the engagement of said stop lever and said cam gear in response to the detection of the calling signal to thereby cause said cam gear to do the first cycle of rotation and in response to the completion of the reproduction of the reply message to thereby cause said cam gear to do the second cycle of rotation, whereby said first magnetic tape runs in response to the detection of the calling signal to reproduce the reply message of the user and said second magnetic tape runs in response to the completion of reproduction of the reply message to record the caller's message.

18. The telephone answering machine of claim 17, wherein said cam gear has first and second drive cam grooves therein, said first drive cam groove being used for moving said first pinch-roller toward the first capstan via the first magnetic tape to run the tape and said second drive cam groove being used for moving said second pinch-roller toward the second capstan via the second magnetic tape to run the tape, and further comprising a cam follower pin which can be engaged in said drive cam groove and couples said cam gear to said movable plate and a first tension spring for forcing said pin in one direction so that said pin is always guided by one of said first and second drive cam grooves and a second tension spring coupled between said pin and said solenoid for, when the solenoid is energized, forcing said pin in the other direction against the force of said first tension spring so that said pin is guided by the other drive cam groove.

* * * * *